United States Patent [19]

Kuwabara

[11] Patent Number: 4,676,939
[45] Date of Patent: Jun. 30, 1987

[54] PROCESS FOR THE PRODUCTION OF EXPANDED PARTICLES OF A POLYPROPYLENE RESIN

[75] Inventor: Hideki Kuwabara, Hadano, Japan

[73] Assignee: Japan Styrene Paper Corporation, Tokyo, Japan

[21] Appl. No.: 742,434

[22] Filed: Jun. 7, 1985

[30] Foreign Application Priority Data

Jun. 14, 1984 [JP] Japan ................. 59-122559
Jun. 19, 1984 [JP] Japan ................. 59-125520

[51] Int. Cl.$^4$ ..................... C08J 9/22; C08J 9/30
[52] U.S. Cl. ....................... 264/50; 264/53; 264/141; 264/DIG. 9; 264/DIG. 16; 264/DIG. 18; 521/56; 521/60; 521/921
[58] Field of Search ............... 264/DIG. 16, 53, 142, 264/50, DIG. 9, 141, DIG. 18; 521/60, 56, 921

[56] References Cited

U.S. PATENT DOCUMENTS

| | | | |
|---|---|---|---|
| 3,470,113 | 9/1969 | Baxmann et al. | 521/60 |
| 3,770,663 | 11/1973 | Ueki et al. | 521/60 |
| 3,912,666 | 10/1975 | Spitzer et al. | 264/DIG. 16 |
| 3,912,667 | 10/1975 | Spitzer et al. | 264/DIG. 16 |
| 4,048,409 | 9/1977 | Sugita et al. | 526/5 |
| 4,104,481 | 8/1978 | Wilkenloh et al. | 174/28 |
| 4,317,888 | 3/1982 | Watanabe et al. | 521/79 |
| 4,328,319 | 5/1982 | Osipow et al. | 264/DIG. 16 |
| 4,379,859 | 4/1983 | Hirosawa et al. | 521/60 X |
| 4,407,768 | 10/1983 | Garcia et al. | 264/DIG. 16 |
| 4,415,680 | 11/1983 | Ushirokawa et al. | 521/60 X |
| 4,429,059 | 1/1984 | Ozutsumi et al. | 521/60 |
| 4,436,840 | 3/1984 | Akiyama et al. | 521/60 X |
| 4,448,901 | 5/1984 | Senda et al. | 521/60 |
| 4,461,737 | 7/1984 | Voss | 264/142 |
| 4,464,484 | 8/1984 | Yoshimura et al. | 521/60 X |
| 4,524,154 | 6/1985 | Maeda et al. | 521/60 X |
| 4,569,810 | 2/1986 | Oriot et al. | 264/142 |

FOREIGN PATENT DOCUMENTS 0095109 11/1983 European Pat. Off. .
2245472 4/1975 France .

OTHER PUBLICATIONS

Chemical Abst., vol. 95 No. 14 10-5-81 p. 37, No. 1164682.
Chemical Abst. vol. 101, No. 10, 9-3-84, p. 46, No. 73745k.
Brydson J. A., *Plastics Materials* Princeton, N.J., D. Van Nostrand, ©1966, pp. 39–43.
Frank, H. P., *Polypropylene* New York, Gordon and Breach Science Publishers, ©1968, pp. 53–58.
*Encyclopedia of Polymer Science and Technology*, vol. 9, "Morphology", New York, Interscience, ©, 1968., p. 247.

*Primary Examiner*—Philip Anderson
*Attorney, Agent, or Firm*—Stephen F. K. Yee

[57] ABSTRACT

A process for the production of expanded particles, which comprises providing an aqueous dispersion containing expandable particles which are formed of a polypropylene resin and which contain a blowing agent and an expansion aid and maintained at a temperature higher than the softening point of the resin and under a pressurized condition, and subjecting the dispersion to a lower pressure so that the expandable particles are expanded. The expansion aid is organic or inorganic solids having a particle size of 0.1 to 150 μm and a melting point higher than the temperature at which the expansion of the expandable particles is performed and serves to improve the expansion ratio.

9 Claims, 5 Drawing Figures

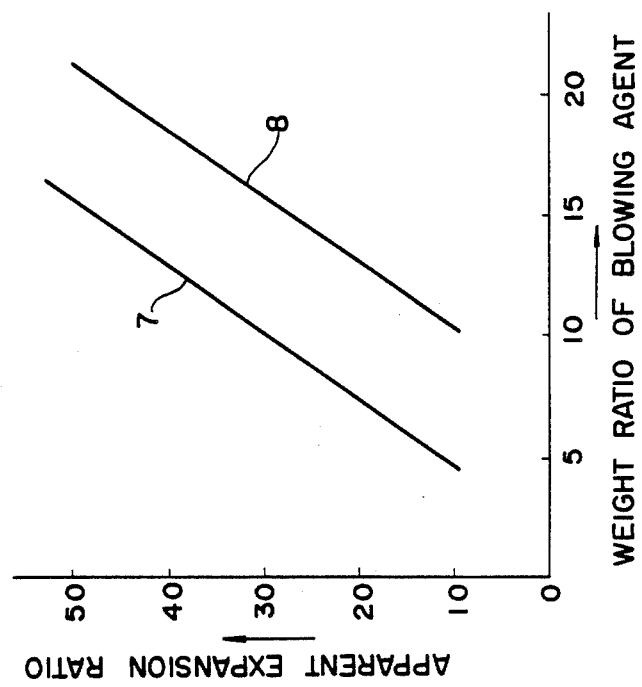
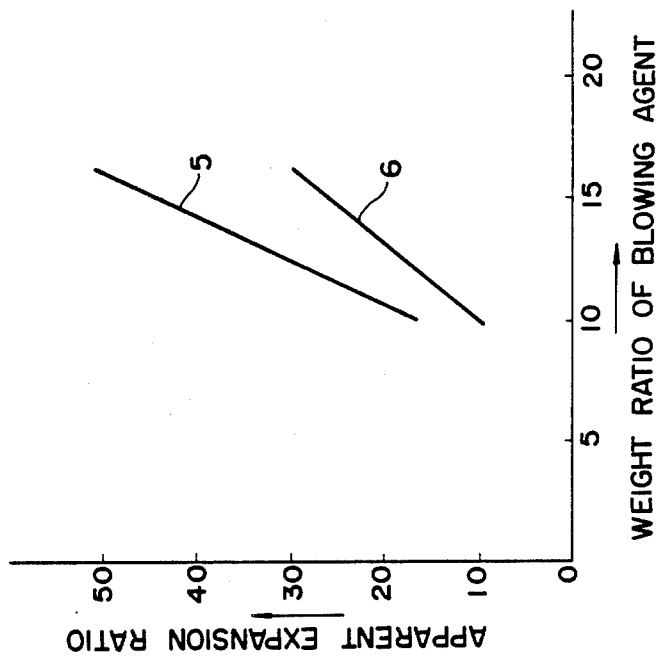

PROCESS FOR THE PRODUCTION OF EXPANDED PARTICLES OF A POLYPROPYLENE RESIN

BACKGROUND OF THE INVENTION

1. Field of the Invention

This invention relates to a process for the production of expanded particles of a polypropylene resin.

2. Related Art

There is a known method of preparing expanded particles of a polypropylene resin, which includes the steps of providing expandable particles of a polypropylene resin containing a volatile blowing agent, dispersing the particles in an aqueous medium contained in a closed vessel, heating the dispersion to a temperature higher than the softening point of the resin while maintaining the pressure within the vessel at a pressure above the vapor pressure of the blowing agent, and discharging the dispersion from the vessel for subjecting same to an atmosphere maintained at a pressure lower than that within the vessel, thereby the particles discharged are expanded. Examples of the volatile blowing agent include propane, butane, pentane, trichlorofluoromethane and dichlorodifluoromethane.

Such a method, however, has been found to involve some problems due to the use of such a volatile blowing agent. Firstly, the temperature at which the expansion is performed should be limited to a specific, narrow range, since otherwise the expandable particles are swelled with the blowing agents which are good solvents for the polymeric material. Therefore, the expansion ratio which is dependent upon the expansion temperature is unavoidably limited within a narrow range. Secondly, some of these blowing agents are dangerous because of their toxicity and inflammability and require the replacement with air after completion of the expansion. Such a replacement requires the recovery of the blowing agents not only because of their expensiveness but also because of their tendency to destroy the ozone layer surrounding the earth.

The present invention has been made with a consideration of the above problems of the conventional expansion method.

SUMMARY OF THE INVENTION

In accordance with the present invention, there is provided an improved process for the production of expanded particles, wherein an aqueous dispersion containing expandable particles of a polypropylene resin and maintained at a first pressure and a first temperature higher than the softening point of said polypropylene resin is subjected to a second pressure lower than said first pressure so that the expandable particles are expanded, the improvement comprising said expandable particles which contain an expansion aid having a particle size of 0.1 to 150 μm and a melting point higher than said first temperature in an amount of 0.05 to 2% based on the weight of said expandable particles.

It has been found that the expansion aid can serve to improve the expansion ratio so that the amount of a volatile blowing agent used for imparting expandability to the starting polymer particles may be reduced. Such an improvement is also obtained when an inorganic gas is used as a blowing agent.

The present invention will now be described in detail below.

BRIEF DESCRIPTION OF THE DRAWINGS

In the accompanying drawings.

FIGS. 3 and 4 are graphs showing the effects of the process of the present invention.

DESCRIPTION OF THE INVENTION

Figure 1:
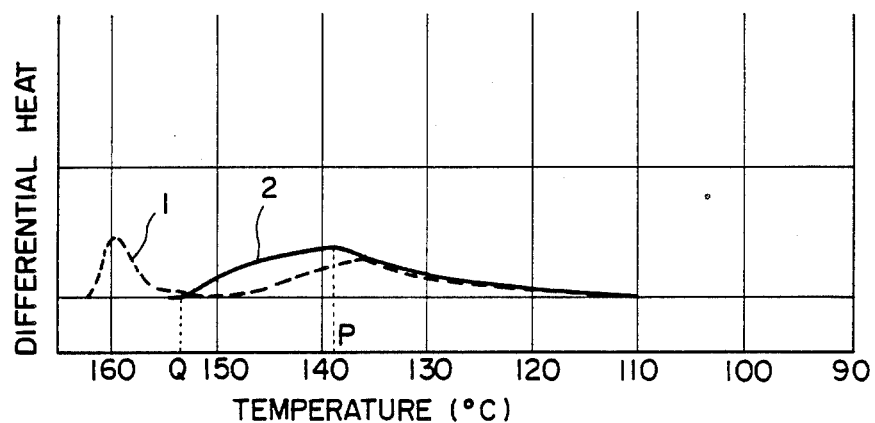
FIGS. 1 and 2 are DSC curves of polypropylene resins.

Both crosslinked and non-crosslinked polypropylene resins may be used as a raw material for the production of expanded particles in the present invention. Examples of the noncrosslinked propylene resin include propylene homopolymers, ethylene-propylene random copolymers, ethylene-propylene block copolymers, propylene-butene random copolymers and propylene-ethylene-butene random copolymers. Above all, the use of non-crosslinked propylene-ethylene random copolymers, especially those having an ethylene content of 1-10 wt %, is preferred for reasons of providing good expandability. Examples of crosslinked polypropylene resin include crosslinked propylene homopolymers, crosslinked propylene-ethylene random copolymers, crosslinked propylene-ethylene block copolymers and crosslinked propylene-butene-1 random copolymers. Above all, the use of crosslinked propylene-ethylene copolymers is preferred. The crosslinked polypropylene resins generally have a gel fraction of at least 0.1%.

The crosslinked polypropylene resins may be suitably obtained by a method including mixing a non-crosslinked polypropylene resin in the form of particles, a crosslinking agent, divinylbenzene and an aqueous medium to impregnate the resin particles with the blowing agent and divinylbenzene, and heating the resulting mixture to a temperature sufficient to decompose the crosslinking agent. Illustrative of suitable crosslinking agents are 1,1-bis(t-butylperoxy)-3,3,5-trimethylcyclohexane, dicumyl peroxide, t-butylcumyl peroxide, n-butyl-4,4-bis(t-butylperoxy)valate, α,α'-bis(t-butylperoxy)-m-diisopropylbenzene and 2,5-dimethyl-2,5-di(t-butylperoxy)hexane. The crosslinking agent is used in an amount of 0.05-5 parts by weight, preferably 0.1-2 parts by weight per 100 parts by weight of the resin. Divinylbenzene is generally used in an amount of 0.05-5 parts by weight per 100 parts by weight of the resin.

One of the important features of the present invention resides in the incorporation of a specific expansion aid into the raw material polypropylene resin. The expansion aid should have a particle size of 0.1-150 μm, preferably 1-100 μm and should be a solid which does not melt at a temperature at which the expansion is performed. Examples of the expansion aid include inorganic materials which are generally used as fillers for various resins and organic compounds or their metal salts which are used as crystal nucleus materials. Illustrative of suitable inorganic materials are inorganic hydroxides such as aluminum hydroxide, calcium hydroxide and magnesium hydroxide; inorganic carbonates such as calcium carbonate, magnesium carbonate and barium carbonate; inorganic sulfites such as calcium sulfite and magnesium sulfite; inorganic sulfates such as calcium sulfate, magnesium sulfate and aluminum sulfate; inorganic oxides such as calcium oxide, aluminum oxide and silicon oxide; and clays or minerals such as talc, kaolin and zeolite. Above all, the use of an inorganic hydroxide such as aluminum hydroxide or an inorganic carbonate such as calcium carbonate is preferred because the expanded particles obtained therewith exhibit excellent moldability. Illustrative of suitable organic expansion aids are dibenzylidenesorbitol and aluminum p-t-butylbenzoate. The use of dibenzylidenesorbitol is especially preferred because the expanded particles obtained using same have excellent modability and give expanded moldings with excellent dimensional stability.

The amount of the expansion aid incorporated into the polypropylene resin particles should be in the range of 0.05 to 2% based on the weight of the polypropylene particles. At least 0.05 weight % is necessary to achieve the object of the present invention. An amount of the expansion aid over 2 weight % causes excessive reduction of the pore size of the expanded particles. Preferably, the amount of the expansion aid is 0.1–1.0 weight % in the case of the inorganic expansion aid and 0.05–0.5 weight %, more preferably 0.1–0.3 weight % in the case of the organic expansion aid.

The polypropylene resin having homogeneously incorporated therein the expansion aid is shaped into particles for expansion treatment according to the present invention. Any conventional method may be adopted for the formation of the particles of the expansion aid-containing polypropylene resin. There may be used, for example, a method in which the resin and the expansion aid are kneaded at a temperature higher than the melting point of the resin, followed by pelletizing or shaping into particles; and a method in which polypropylene resin pellets with a high content of the expansion aid and polypropylene resin pellets without the expansion aid are kneaded at a temperature above the melting point of the resin, followed by pelletizing or shaping into particles. The expansion aid-containing polypropylene resin particles preferably have a particle size of 0.3 to 5 mm, more preferably 0.5 to 3 mm.

The expansion aid-containing polypropylene resin particles are subjected to an expansion step in a manner known per se. Thus, the resin particles are contacted with a blowing agent such as an inorganic gas, a volatile blowing agent or a mixture thereof to impregnate the resin particles with the blowing agent, heated to a temperature higher than the softening point of the resin, dispersed in an aqueous medium, and maintained under a pressurized condition, thereby to obtain a dispersion maintained at a first pressure and containing expandable resin particles. By subjecting the dispersion to an atmosphere having a pressure lower than the first pressure, generally ambient pressure, the expandable resin particles are foamed and expanded. The expansion step is preferably performed by opening a valve or outlet port connected to the vessel in which the dispersion is contained under pressure, to thereby discharge the dispersion into the atmosphere.

Figure 5:
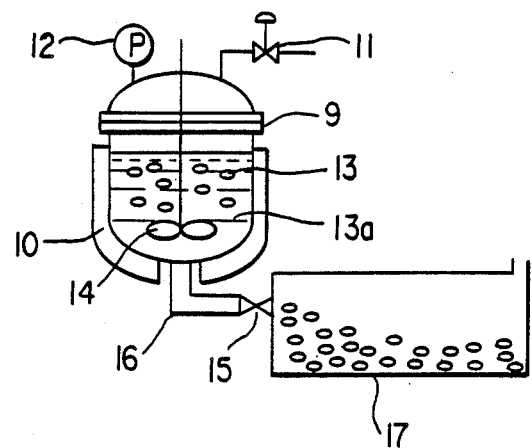
FIG. 5 is a schematic showing an example of an apparatus useful for the process of the present invention.

An example of an apparatus suitable for the practice of the present invention is illustrated in FIG. 5, in which an airtight vessel 9 is provided with a heater 10, a control valve 11 through which a pressurizing fluid such as nitrogen gas is admitted, and a pressure gauge 12. Polypropylene resin particles 13 containing the expansion aid are charged into the vessel 9, contacted with a blowing agent and dispersed in an aqueous medium, is stirred by a stirrer 14 as the dispersion is heated by heater 10 to a temperature above the softening point of the resin particles. Finely-divided solids, if used to prevent melt-adhesion of the particles to each other during expansion, may be added to the dispersion. Introduction of a gas through valve 11 maintains vessel 9 and the dispersion under a pressurized condition. The dispersion is released through a discharge valve 15 in outlet 16, into an atmosphere maintained at a pressure lower than the pressure inside vessel 9, to expand the particles. Conveniently, this may be achieved by releasing the dispersion into a tank 17 which is maintained at atmospheric pressure.

Examples of the organic blowing agent include aliphatic hydrocarbons such as propane, n-butane, i-butane, butylene, i-butene, pentane, neopentane and hexane; halogenated aliphatic hydrocarbons such as monochloromethane, monochloroethane, dichlorofluoromethane, dichlorodifluoromethane, trifluoromethane and trichlorotrifluoroethane; and alicyclic hydrocarbons such as cyclopentane and cyclohexane. These compounds may be used singly or as a mixture of two or more. Such an organic blowing agent may be suitably used in an amount of 2 to 20 parts by weight, more preferably 3 to 18 parts by weight per 100 parts by weight of the polypropylene resin.

Examples of inorganic gas blowing agent include air, nitrogen, carbon dioxide, argon and helium. When an inorganic gas is used as a blowing agent to expand the unexpanded particles of a polypropylene resin, the unexpanded particles are contacted with the inorganic gas at a pressurized condition, preferably at a pressure of 15–100 kg/cm$^2$G more preferably 20–70 kg/cm$^2$G, preferably at a temperature higher than the softening point of the polypropylene resin. The contact time varies with the pressure, temperature, the kind of the polypropylene resin and the intended expansion ratio, but is generally 5 sec to 1 hour, preferably 5 min to 30 min, when the contact is performed at a temperature higher than the softening point of the resin.

The steps including impregnating the resin particles with the blowing agent, heating them, dispersing them in an aqueous medium, and pressurizing them for the formation of a dispersion containing expandable resin particles may be conducted in any desired order. Heating of the resin particles to a temperature above the softening point thereof is preferably carried out gradually, at a rate of 1°–10° C./min, more preferably 2°–5° C./min. The aqueous medium into which the resin particles are dispersed is generally water which optionally contains an organic solvent such as ethylene glycol, glycerin, methanol or ethanol.

In the present specification, the term "softening point" is intended to mean a value measured in accordance with ASTM D648 with a load of 4.6 Kg/mm$^2$ and the term "melting point" is intended to refer to a value measured by differential scanning calorimetric analysis (DSC method (see "Plastics Analysis Guide", Hanser Publishers, page 264+)). In the DSC method, the sample is heated to 200°–300° C. in an atmosphere of nitrogen at a rate of 10° C./min (first heating stage) while measuring the temperature of the sample and the differential heat required for raising the temperature of the sample. After the sample is heated to a predetermined temperature, it is cooled to 50° C. at a rate of 10° C./min. Thereafter, the sample is heated again (second heating stage), for example, in the same manner as in the first heating stage. The melting point is a temperature (see point P in FIG. 1) at which a peak exists in the curve obtained when the results of the second heating stage are plotted with the temperature as abscissa against the differential heat as ordinate. When the curve has two or more peaks, the melting point represents the peak at the highest temperature. The temperature at which the curve reached to the base line (see, for example, point Q in FIG. 1) is termed as "melt-completion temperature".

To prevent melt-adhesion of the polymer particles with each other during the expansion step, it is advisable to add to the dispersion finely divided solids which do not soften or melt at a temperature to which the resin particles are heated for effecting the expansion. Illustrative of suitable solids are aluminum oxide, titanium oxide, basic magnesium carbonate, basic zinc carbonate and calcium carbonate. Organic solid particles such as urea-formaldehyde resin particles which are insoluble in the aqueous medium may also be used. Such finely divided solid particles preferably have a particle size of 0.001 to 100 μm, more preferably 0.001 to 30 μm and may be used in an amount of 0.01 to 10 parts by weight per 100 parts by weight of the polypropylene resin particles.

It is preferred that the expandable polypropylene resin particles contained in the dispersion which is subjected to lower pressure conditions for effecting the expansion have secondary crystals since the resulting expanded particles may exhibit excellent moldability and afford molded articles with an excellent dimensional stability. The presence of the secondary crystals is especially preferred when the polypropylene resin is a non-crosslinked polypropylene resin.

The secondary crystals may be generally formed by maintaining the dispersion containing the expandable resin particles at a temperature between a temperature 20° C. lower than the melting point of the resin and the melt-completion temperature of the resin for a period of time of 5–90 min, preferably 15–60 min. By allowing the secondary crystals to form and grow sufficiently, even when the dispersion is heated to an expansion temperature which is higher than the melt-completion temperature, the resultant expanded particles may still contain the secondary crystals which remain undestroyed during the expansion step.

Whether or not the expanded particles produced contain the secondary crystals can be tested by differential scanning calorimetry (DSC) techniques. For this purpose, the polypropylene resin particles (1 to 3 mg) is heated at a rate of 10° C./min to 220° C. using a differential scanning calorimeter while measuring the temperature of the sample and the heat required for heating the sample. The results are plotted with the temperature as abscissa and the heat as ordinate to give a curve (first DSC curve). The heated sample is then cooled at a rate of 10° C./min to about 40° C. Thereafter, the sample is again heated in the same manner as in the first heating stage as mentioned above to give a second DSC curve. Each of the first and second DSC curves has a peak (characteristic peak) which is responsible for the absorption of heat during the melting of the resin and which is characteristic to the resin. The temperatures at the characteristic peaks in the first and second DSC curves are the same or different from each other. The difference is below 5° C., generally below 2° C., however. In addition to the characteristic peak there may be a peak (high temperature peak) in the first DSC curve at a temperature higher than that of the characteristic peak. The high temperature peak is attributed to the absorption of heat for the destruction of the secondary crystals. Thus, the existence or non-existence of the secondary crystals can be seen from the presence or absence of the high temperature peak. That is, if the first DSC curve shows substantially no such high temperature peak, then the sample is regarded as containing substantially no secondary crystals. The second DSC curve shows no such high temperature peak because the secondary crystals if any have been destroyed during the first heating stage. It is preferred that the difference in temperature between the high temperature peak and characteristic peak of the second DSC curve be great because the greater the difference the more stable are the secondary crystals. The difference is preferably over 5° C., more preferably over 10° C.

Figure 2:
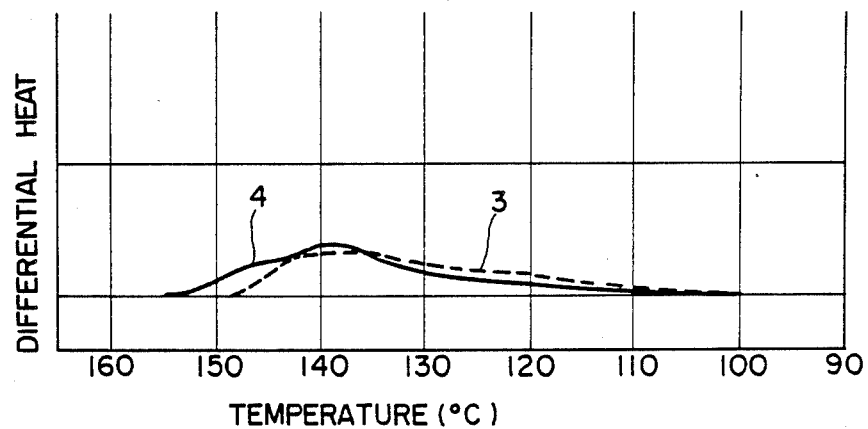

FIGS. 1 and 2 are DSC curves of Sample A (expanded particles of polypropylene having secondary crystals) and Sample B (expanded particles of polypropylene having no secondary crystals), respectively, obtained using a differential scanning calorimeter DT-30 (manufactured by Shimadzu Mfg. Co., Ltd.). In FIGS. 1 and 2, the curves 1 and 3 by dotted lines represent first DSC curves while curves 2 and 4 by solid lines are second DSC curves. The curve 1 in FIG. 1 has a high temperature peak at about 160° C. in addition to a characteristic peak at about 136° C., indicating the presence of secondary crystals in the expanded particles of Sample A. The curve 3 in FIG. 2 has merely a characteristic peak at about 137° C., showing that no secondary crystals exist in the expanded particles of Sample B. The absence of a high temperature peak in curve 3 is ascribed to the omission of the secondary crystals-forming treatment. The high temperature peak disappears in the second DSC curve 2 of FIG. 1. As described previously, the point P (139° C.) at which the second DSC curve 2 becomes maximum is the melting point of the resin and the point Q (153° C.) at which the second DSC curve 2 reaches to the base line represents the melt-completion temperature.

As described previously, the expansion temperature is generally not lower than the softening point of the polypropylene resin. A suitable expansion temperature varies with the kind of the blowing agent. When a volatile organic blowing agent is used by itself as the blowing agent, the expansion temperature is preferably between a temperature about 10° C. lower than the melting point and a temperature about 5° C. higher than the melting point, more preferably between a temperature 5° C. lower than the melting point and a temperature about 3° C. higher than the melting point. When an inorganic gas is used by itself as the blowing agent, the expansion temperature is preferably between the melting point and a temperature about 20° C., more preferably about 18° C. higher than the melting point. In the case of cojoint use of the inorganic gas and the volatile organic blowing agent, the expansion temperature is preferably between a temperature about 5° C. lower than the melting point and a temperature about 18° C. higher than the melting point, more preferably between a temperature about 3° C. lower than the melting point and a temperature about 16° C. higher than the melting point.

By incorporating the expansion aid into the polypropylene resin particles to be expanded, expanded particles are obtained with an improved expansion ratio so that the amount of a volatile organic blowing agent used can be decreased. Further, the use of the expansion aid can reduce the variation is expansion ratio. Additionally, the incorporation of the expansion aid makes it possible to use an inorganic gas as a blowing agent. The expanded particles obtained by the process of the present invention can be suitably used for various purposes. Especially, they are advantageously used as raw materials for the production of molded foamed articles. In the preparation of such molded articles, the expanded particles are filled in a mold and heated, for example, with steam for further expansion of the particles therewithin.

The following examples will further illustrate the present invention.

EXAMPLE 1

A non-crosslinked ethylene-propylene random copolymer having an ethylene content of 2.8 weight %, a melting point of 145° C. and a melt-completion temperature of 155° C. and an expansion aid (dibenzylidenesorbitol) were kneaded by means of a mixer and extruded through a die in a strand fashion. The extrudates were immediately immersed into cooling water to form expansion aid-containing polypropylene resin pellets. The content of the expansion aid in the pellets was as shown in Table 1. Into an air-tight vessel were charged 100 parts by weight of the thus obtained pellets, 0.3 parts by weight of finely divided aluminum oxide, 300 parts by weight of water and dichlorodifluoromethane in the amount shown in Table 1. The mixture was then heated to 140° C. with stirring and maintained at that temperature for 30 min. Nitrogen gas was fed to the vessel until the pressure therewithin became 40 kg/cm²G. After heating the dispersion within the vessel to 145° C., the vessel was opened to discharge the dispersion contained therewithin into an open atmosphere while maintaining the pressure therewithin unchanged, thereby the pellets were expanded. The apparent expansion ratio (a ratio by apparent volume of expanded particles to unexpanded particles) of the resultant expanded particles was as shown in Table 1. The results of Experiments Nos. 2-4 and 7-9 are also shown by way of a graph in FIG. 3, in which the lines 5 and 6 are plots of Experiments Nos. 2-4 and 7-9, respectively. From the results shown in Table 1 and FIG. 3, it is apparent that the incorporation of the expansion aid into the pellets greatly improves the expansion ratio. The expanded particles of Experiments Nos. 1-9 were found to contain, secondary crystals.

TABLE 1

| Experiment No. | Content of Expansion Aid* (wt %) | Amount of Blowing agent** (part by weight) | Apparent Expansion Ratio |
|---|---|---|---|
| 1 | 0.06 | 16 | 35 |
| 2 | 0.2 | 16 | 50 |
| 3 | 0.2 | 13 | 33 |
| 4 | 0.2 | 10 | 16 |
| 5 | 0.45 | 16 | 52 |
| 6*** | 0.04 | 16 | 32 |
| 7*** | 0 | 16 | 30 |
| 8*** | 0 | 13 | 20 |
| 9*** | 0 | 10 | 10 |

*Dibenzylidenesorbitol
**Dichlorodifluoromethane
***Comparative Experiment

EXAMPLE 2

Example 1 was repeated in the same manner as described except that aluminum hydroxide with a particle size of about 80 μm was used as the expansion aid in place of dibenzylidenesorbitol and the dispersion was maintained at 145° C. rather than 140° C. The results are shown in Table 2 and FIG. 4. In FIG. 4, the lines 7 and 8 represent the results of Experiments Nos. 10-12 and 13-16, respectively. From the results shown in Table 2 and FIG. 4, it is evident that the incorporation of the expansion aid significantly improves the expansion ratio of the resin particles. The expanded particles of Experiments Nos. 10-16 were found to contain secondary crystals.

TABLE 2

| Experiment No. | Content of Expansion Aid* (wt %) | Amount of Blowing agent** (part by weight) | Apparent Expansion Ratio |
|---|---|---|---|
| 10 | 0.3 | 5 | 12 |
| 11 | 0.3 | 10 | 30 |
| 12 | 0.3 | 15 | 46 |
| 13*** | 0 | 10 | 9 |
| 14*** | 0 | 15 | 25 |
| 15*** | 0 | 18 | 34 |
| 16*** | 0 | 20 | 46 |

*Aluminum hydroxide
**Dichlorodifluoromethane
***Comparative Experiment

EXAMPLE 3

The Experiment No. 2 of Example 1 was repeated in the same manner as described except that aluminum p-t-butylbenzoate was used as the expansion aid in place of dibenzylidenesorbitol. The expanded particles had an apparent expansion ratio of 48.

EXAMPLE 4

The Example No. 11 of Example 2 was repeated in the same manner as described using each of the inorganic solids shown in Table 3 as the expansion aid. The results are shown in Table 3.

TABLE 3

| Experiment No. | Inorganic Expansion Aid | Apparent Expansion Ratio |
|---|---|---|
| 18 | Talc | 36 |
| 19 | Clay | 33 |
| 20 | Calcium sulfite | 32 |
| 21 | Calcium sulfate | 35 |

EXAMPLE 5

100 Parts by weight of the dibenzylidenesorbitol-containing pellets obtained in Example 1, 0.3 parts by weight of aluminum oxide and 300 parts by weight of water were charged into an air-tight vessel, heated to 145° C. with stirring and maintained at that temperature for 30 min. The dispersion in the vessel was then heated to 155° C., to which was then fed nitrogen gas until the pressure therewithin reached the value shown in Table 4. Thereafter, the dispersion was maintained at 155° C. for additional 30 min to render the polypropylene resin pellets expandable. Then the vessel was opened to discharge the dispersion therefrom while maintaining the pressure therewithin unchanged so that the expandable pellets are expanded. The apparent expansion ratio of each expanded product thus obtained is shown in Table 4. The above procedure was repeated in the same manner as described except that the polypropylene resin pellets containing no dibenzylidenesorbitol were used as a raw material. The results were as shown in Table 4. The expanded particles of Experiments 22-29 were found to contain secondary crystals.

TABLE 4

| Experiment No. | Nitrogen Pressure (Kg/cm² G) | Apparent Expansion Ratio |
|---|---|---|
| 22 | 20 | 5 |
| 23 | 30 | 10 |
| 24 | 40 | 16 |

TABLE 4-continued

| Experiment No. | Nitrogen Pressure (Kg/cm² G) | Apparent Expansion Ratio |
|---|---|---|
| 25 | 60 | 19 |
| 26* | 20 | 3 |
| 27* | 30 | 7 |
| 28* | 40 | 10 |
| 29* | 60 | 12 |

*Comparative Experiment (without use of expansion aid)

EXAMPLE 6

Example 5 was repeated in the same manner as described except that the raw material resin pellets used were those of Example 2 (containing 0.3 weight % of aluminum hydroxide) and the expansion temperature was 156° C. The results are shown in Table 5.

TABLE 5

| Experiment No. | Nitrogen Pressure (Kg/cm² G) | Apparent Expansion Ratio |
|---|---|---|
| 30 | 20 | 5 |
| 31 | 30 | 10 |
| 32 | 40 | 13.5 |
| 33 | 60 | 15 |

EXAMPLE 7

A non-crosslinked ethylene-propylene random copolymer having an ethylene content of 3.5 weight %, a melting point of 142° C. and a melt-completion temperature of 155° C. was kneaded together with dibenzylidenesorbitol. The kneaded mixture with a dibenzylidenesorbitol content of 0.2 weight % was then shaped into pellets by extrusion in the same manner as that in Example 1. Into an air-tight vessel were then charged 100 parts by weight of the thus obtained pellets, 0.3 parts by weight of finely divided aluminum oxide, 0.5 parts by weight of dicumylperoxide, 1 part by weight of divinylbenzene and 300 parts by weight of water. The mixture was heated to 150° C. with stirring and maintained at that temperature for 1 hour to effect crosslinking. After being cooled to room temperature, the resulting dispersion was mixed with 16 parts by weight of dichlorodifluoromethane and heated to 145° C. with stirring and maintained at that temperature for 30 min. The resultant dispersion was then heated to 150° C. and maintained at that temperature for additional 30 min. After pressurizing the vessel with nitrogen gas to 40 kg/cm²G, the dispersion within the vessel was discharged to the air to allow the pellets to expand. The expanded particles thus obtained had an apparent expansion ratio of 40 and a gel fraction of 40% and were found to contain secondary crystals.

EXAMPLE 8

Example 7 was repeated in the same manner as described except that the polypropylene resin pellets were formed of an ethylene-propylene random copolymer having a melting point of 143° C. and incorporated with 0.3 weight % of aluminum hydroxide in place of dibenzylidenesorbitol. The expanded particles obtained had an apparent expansion ratio of 38 and were found to contain secondary crystals.

For the purpose of comparison, the above procedure was repeated without incorporating aluminum hydroxide into the polypropylene resin pellets. The expanded particles thus obtained had an apparent expansion ratio of 25.

EXAMPLE 9

100 parts by weight of polypropylene resin pellets formed of the copolymer shown in Table 6 and containing the inorganic expansion aid shown in Table 6, 0.3 parts by weight of finely divided aluminum oxide and 300 parts by weight of water were charged into an air-tight vessel and gradually heated to 150° C. (145° C. in the case of Experiment No. 40 with stirring and maintained at that temperature for 30 min for the formation of secondary crystals. After the resulting dispersion was heated to the expansion temperature shown in Table 6, the inorganic gas shown in Table 6 was fed to the vessel until the pressure within the vessel reached to the value shown in Table 6. The vessel was maintained at that pressure throughout the expansion operation. After the dispersion was maintained at the expansion temperature for the period of time shown in Table 6, the vessel was opened to discharge the dispersion therefrom to an open atmosphere, thereby to expand the polypropylene resin pellets. The expanded particles thus obtained in each experiment were found to contain secondary crystals. The apparent expansion ratios and cell pore sizes of the expanded particles are shown in Table 6.

The expanded particles thus obtained were then subjected to molding to form a molded article. Thus, the expanded particles were held in an air-pressurized atmosphere so that the pressure within the cells thereof became 1.2 kg/cm²G. The expanded particles with their cells being charged with pressurized air were then filled in a mold and heated with pressurized steam (3.2 kg/cm²G) for further expansion thereof, thereby obtaining the molded article whose quality (dimensional stability and fusion) is shown in Table 6.

TABLE 6

| Experiment No. | Polypropylene Resin | Expansion Aid Kind (particle size μm) | Amount (wt %) | Expansion Temp. (°C.) | Maintenance Time at Expansion Temp. (min.) | Blowing Agent Kind | Pressure (kg/cm² G) | Apparent Expansion Ratio | Cell Size *3 | Dimensional Stability *4 | Fusion *5 |
|---|---|---|---|---|---|---|---|---|---|---|---|
| 37 | E/P*1 (3.2) | Al(OH)₃ (80) | 1.8 | 156 | 15 | N₂ | 45 | 13 | B | A | B |
| 38 | E/P*1 (3.2) | Al(OH)₃ (4) | 0.3 | 156 | 30 | N₂ | 45 | 12 | A | A | A |
| 39 | E/P*1 (3.2) | Al(OH)₃ (30) | 0.1 | 156 | 30 | N₂ | 45 | 11 | A | A | A |
| 40 | B/P*2 (20) | Al(OH)₃ (50) | 0.2 | 155 | 45 | Air | 60 | 15 | A | A | A |
| 41 | E/P*1 (3.2) | CaCO₃ (25) | 0.2 | 157 | 30 | Air | 40 | 14 | A | A | A |
| 42 | E/P*1 (3.2) | Al(OH)₃ (80) | 3 | 156 | 30 | N₂ | 45 | 13 | C | B | C |
| 43 | E/P*1 | none | — | 156 | 30 | N₂ | 45 | 10 | A | A | A |

TABLE 6-continued

| Experiment No. | Polypropylene Resin | Expansion Aid | | Expansion Temp. (°C.) | Maintenance Time at Expansion Temp. (min.) | Blowing Agent | | Apparent Expansion Ratio | Cell Size *3 | Dimensional Stability*4 | Fusion *5 |
|---|---|---|---|---|---|---|---|---|---|---|---|
| | | Kind (particle size μm) | Amount (wt %) | | | Kind | Pressure (kg/cm² G) | | | | |
| | (3.2) | | | | | | | | | | |

*1 Ethylene/propylene random copolymer having an ethylene content of 3.2% by weight, a melting point of 141° C. and a melt-completion temperature of 154° C.
*2 1-Butene-propylene random copolymer having a 1-butene content of 20% by weight, a melting point of 142° C. and a melt-completion temperature of 152° C.
*3 Pore size is rated as follows:
A . . . 0.05 mm or more
B . . . 0.005 mm or more but less than 0.05 mm
C . . . less than 0.005 mm
*4 Dimensional stability is rated as follows:
A . . . Shrinkage in the widthwise direction is 3% or less.
B . . . Shrinkage in the widthwise direction is more than 3% but less than 4%.
C . . . Shrinkage in the widthwise direction is 4% or more.
*5 Fusion between cells is tested by cracking the molded sample and observing the breakage of the cells on the cracked surface. Fusion is rated as follows:
A . . . Broken cells amount to 60% or more.
B . . . Broken cells amount to 40% or more but less than 60%.
C . . . Broken cells amount to less than 40%.

I claim:

1. In a process for the production of expanded particles, wherein an aqueous dispersion comprising polypropylene resin particles containing a blowing agent and an aqueous medium, and maintained within a closed vessel under pressure and at a temperature higher than the softening point of the polypropylene resin particles, is released from one end of the vessel into an atmosphere maintained at a pressure lower than that within the vessel to expand the polypropylene resin particles, the improvement comprising said polypropylene resin particles which contain an expansion aid having a particle size of 0.1 to 150 μm and a melting point higher than said temperature at which said aqueous dispersion is maintained, in an amount of 0.05 to 2% based on the weight of the polypropylene resin particles, said expansion aid being an organic, crystal nucleus material or an inorganic material selected from the group consisting of aluminum hydroxide, calcium hydroxide, magnesium hydroxide, magnesium carbonate, barium carbonate, calcium sulfite, magnesium sulfite, calcium sulfate, magnesium sulfate, aluminum sulfate, calcium oxide, kaolin and zeolite.

2. A process as claimed in claim 1, wherein said crystal nucleus material is dibenzylidenesorbitol or aluminum p-t-butylbenzoate.

3. A process as claimed in claim 1, wherein the content of said crystal nucleus material in the polypropylene resin particles is 0.1-0.3% by weight.

4. A process as claimed in claim 1, wherein the content of said inorganic material in said polypropylene resin particles is 0.1-1.0% by weight.

5. A process as claimed in claim 1, wherein said blowing agent is an organic volatile blowing agent.

6. A process as claimed in claim 1, wherein said blowing agent is an inorganic gas.

7. A process as claimed in claim 1, wherein said blowing agent is a mixture of an organic volatile blowing agent and an inorganic gas.

8. A process as claimed in claim 1, wherein said polypropylene resin contains secondary crystals.

9. A process as claimed in claim 1, wherein said polypropylene resin is an ethylene-propylene random copolymer.

* * * * *